(12) United States Patent
Rephlo et al.

(10) Patent No.: US 11,715,153 B2
(45) Date of Patent: Aug. 1, 2023

(54) SYSTEM AND METHOD FOR PROVIDING PURCHASE HISTORY TO AN ACCOUNT HOLDER

(71) Applicant: Capital One Services, LLC, McLean, VA (US)

(72) Inventors: Jeremy Rephlo, Washington, DC (US); Gagan Kanjlia, Ashburn, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 502 days.

(21) Appl. No.: 15/943,098

(22) Filed: Apr. 2, 2018

(65) Prior Publication Data
US 2018/0225755 A1    Aug. 9, 2018

Related U.S. Application Data (63) Continuation of application No. 14/168,107, filed on Jan. 30, 2014, now Pat. No. 9,978,099.

(60) Provisional application No. 61/758,510, filed on Jan. 30, 2013.

(51) Int. Cl.
    *G06Q 40/02* (2023.01)
    *G06Q 50/00* (2012.01)

(52) U.S. Cl.
    CPC .............. *G06Q 40/02* (2013.01); *G06Q 50/01* (2013.01)

(58) Field of Classification Search
    CPC ................................ G06Q 40/02; G06Q 50/01
    USPC .......................................................... 705/35
    See application file for complete search history.

(56) References Cited

U.S. PATENT DOCUMENTS

| | | | | |
|---|---|---|---|---|
| 10,460,376 | B1* | 10/2019 | Krakowiecki | G06Q 40/00 |
| 2010/0306080 | A1* | 12/2010 | Trandal | G06Q 10/10 |
| | | | | 705/26.8 |
| 2012/0030109 | A1* | 2/2012 | Dooley Maley | G06Q 20/2295 |
| | | | | 705/44 |
| 2012/0053987 | A1 | 3/2012 | Satyavolu et al. | |
| 2012/0084164 | A1* | 4/2012 | Hammad | G06Q 20/202 |
| | | | | 705/21 |
| 2012/0226545 | A1* | 9/2012 | Gebb | G06Q 20/387 |
| | | | | 705/14.27 |
| 2012/0290609 | A1* | 11/2012 | Britt | G06Q 20/327 |
| | | | | 707/769 |
| 2013/0091452 | A1* | 4/2013 | Sorden | G01C 21/32 |
| | | | | 715/771 |
| 2014/0337175 | A1* | 11/2014 | Katzin | G06Q 30/00 |
| | | | | 705/26.62 |

\* cited by examiner

*Primary Examiner* — Jessica Lemieux
(74) *Attorney, Agent, or Firm* — Troutman Pepper Hamilton Sanders LLP; Christopher J. Forstner; John A. Morrissett

(57) ABSTRACT

The system and methods provide an account holder with a mobile spend feed. The systems and methods include a database that stores information associated with at least one previous financial transaction performed via a financial account held by the account holder, a transaction processor that receives transaction data associated with a financial transaction performed by the account holder using the financial account, and stores the transaction data in the database, and a purchase history processor creates a spend feed based at least in part on the transaction data and the previous transaction information, and provides the spend feed to the account holder.

20 Claims, 8 Drawing Sheets

SYSTEM AND METHOD FOR PROVIDING PURCHASE HISTORY TO AN ACCOUNT HOLDER

CROSS-REFERENCE TO RELATED APPLICATIONS

This application is a continuation of, and claims priority under 35 U.S.C. § 120 to, U.S. patent application Ser. No. 14/168,107, now U.S. Pat. No. 9,978,099, filed Jan. 30, 2014, which claims priority to U.S. Provisional Patent Application No. 61/758,510, filed on Jan. 30, 2013, the entire contents of which are incorporated herein by reference.

FIELD OF THE DISCLOSURE

The present disclosure relates to systems and methods for providing a purchase history to an account holder at the account holder's mobile device.

BACKGROUND OF THE DISCLOSURE

Currently, mobile wallets only offer a partial experience by simply allowing a user to use a smart phone to pay for a point of sale transaction. In some instances, the users are given the ability to pay using any available reward points from their stores loyalty program. The current mobile wallets have the disadvantage of not offering users the ability to do more than pay for a transaction. However, users want to have richer point of sales experiences. For example, users may want to see their purchase history to determine where they have been shopping.

These and other drawbacks exist.

SUMMARY OF THE DISCLOSURE

Example embodiments include systems and methods that provide an account holder with a mobile spend feed. The system includes a database that stores information associated with at least one previous financial transaction performed via a financial account held by the account holder, a transaction processor that receives transaction data associated with a financial transaction performed by the account holder using the financial account, and stores the transaction data in the database, and a purchase history processor creates a spend feed based at least in part on the transaction data and the previous transaction information, and provides the spend feed to the account holder.

The method includes storing information associated with at least one previous financial transaction performed via a financial account held by the account holder in a spend feed database, receiving, via a network, transaction data associated with a financial transaction performed by the account holder using the financial account, storing the transaction data in the spend feed database, creating a spend feed based at least in part on the transaction data and the previous transaction information, and providing the spend feed to the account holder.

BRIEF DESCRIPTION OF THE DRAWINGS

Various embodiments of the present disclosure, together with further objects and advantages, may best be understood by reference to the following description taken in conjunction with the accompanying drawings, in the several Figures of which like reference numerals identify like elements, and in which.

DETAILED DESCRIPTION OF THE EMBODIMENTS

The following description is intended to convey a thorough understanding of the embodiments described by providing a number of specific example embodiments and details involving systems and methods for providing a financial account holder with a purchase history (spend feed) on his or her mobile device. It should be appreciated, however, that the present disclosure is not limited to these specific embodiments and details, which are examples only. It is further understood that one possessing ordinary skill in the art, in light of known systems and methods, would appreciate the use of the disclosure for its intended purposes and benefits in any number of alternative embodiments, depending on specific design and other needs. A financial institution and system supporting a financial institution are used as examples for the disclosure. The disclosure is not intended to be limited to financial institutions only.

Figure 1:
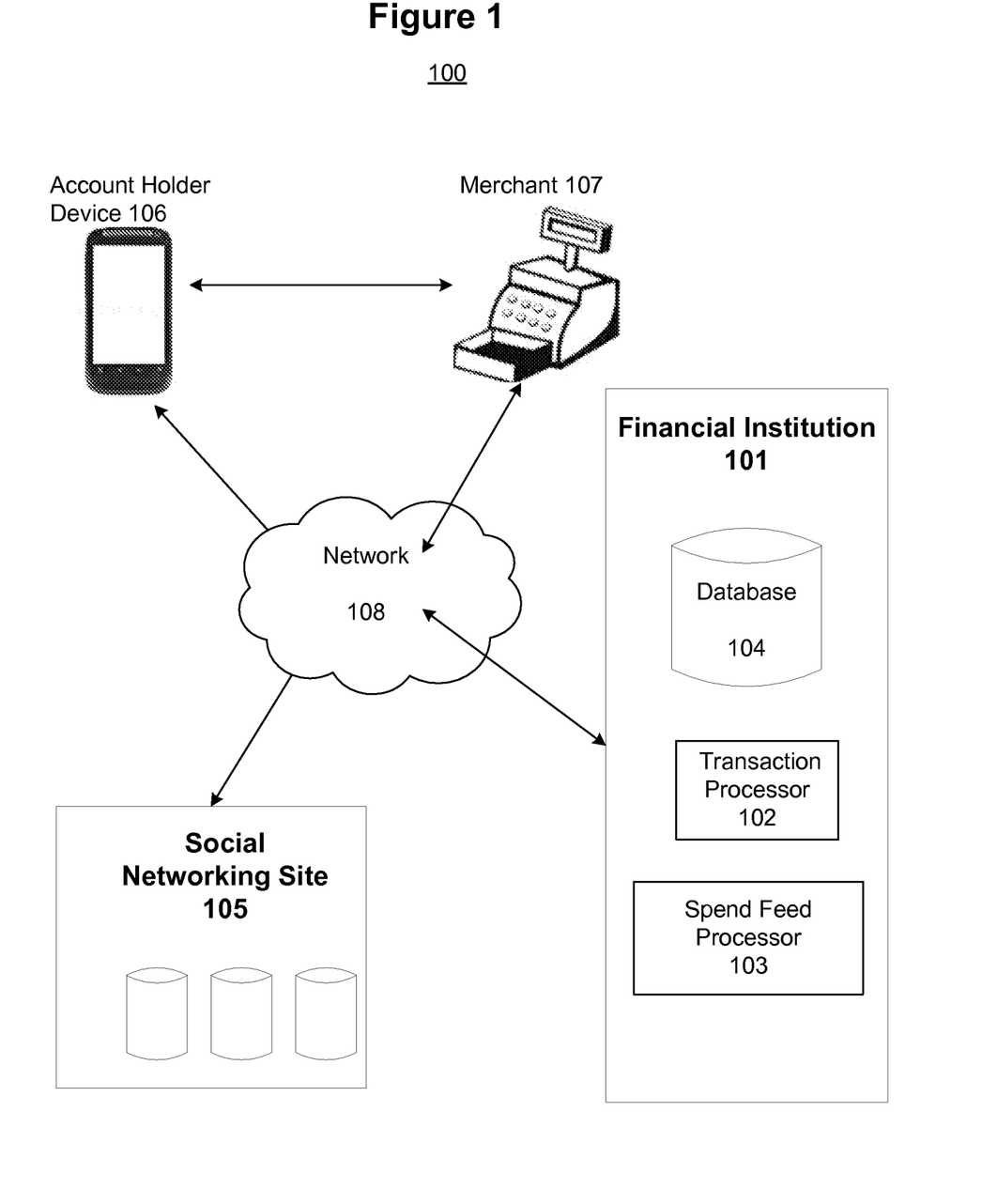
FIG. 1 depicts a schematic diagram of a system for providing a spend feed to an account holder at his or her mobile device according to an example embodiment of the disclosure.

FIG. 1 depicts an example embodiment of a system for providing a financial account holder with purchase history, or a "spend feed," on his or her mobile device, according to various embodiments of the disclosure. As referred to herein, a "spend feed" may include, for example, an interactive, feature-rich purchase history associated with a user account (e.g., a credit and/or debit account) as shown and described herein. Referring to FIG. 1, the system may include various network-enabled computer systems, including, as depicted in FIG. 1 for example, a financial institution 101; comprising a transaction processor 102, a spend feed processor 103, and a database 104, which may be included as separate processors or combined into a single processor or device having the multiple processors. The system may also include a social networking site 105. Examples of social networking sites include, without limitation, Facebook, MySpace, Google+, LinkedIn, Twitter, Pintrest, etc. The social networking site may include a plurality of social networking accounts created by one or more users. The users may also be account holders with the financial institution 101.

In various examples, the spend feed processor 103, database 104, and/or the transaction processor 102 may be separate from financial institution 101. For example, spend feed processor 103, database 104, and/or transaction processor 102 may be integrated into social networking site 105. As referred to herein, a network-enabled computer system and/or device may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The network-enabled computer systems may execute one or more software applications to, for example, receive data as input from an entity accessing the network-enabled computer system, process received data, transmit data over a network, and receive data over a network. The one or more network-enabled computer systems may also include one or more software applications to enable the creation and provisioning of an account holder's purchase history.

The components depicted in FIG. 1 may store information in various electronic storage media, such as, for example, database 104. Electronic information, files, and documents may be stored in various ways, including, for example, a flat file, indexed file, hierarchical database, relational database, such as a database created and maintained with software from, for example, Oracle® Corporation, Microsoft® Excel file, Microsoft® Access file, or any other storage mechanism.

The components depicted in FIG. 1 may be coupled via one or more networks, such as, for example, network 108. Network 108 may be one or more of a wireless network, a wired network or any combination of wireless network and wired network. For example, network 108 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11b, 802.15.1, 802.11n and 802.11g or any other wired or wireless network for transmitting and receiving a data signal.

In addition, network 108 may include, without limitation, telephone lines, fiber optics, IEEE Ethernet 902.3, a wide area network ("WAN"), a local area network ("LAN"), or a global network such as the Internet. Also network 108 may support an Internet network, a wireless communication network, a cellular network, or the like, or any combination thereof. Network 108 may further include one network, or any number of the example types of networks mentioned above, operating as a stand-alone network or in cooperation with each other. Network 108 may utilize one or more protocols of one or more network elements to which they are communicatively coupled. Network 108 may translate to or from other protocols to one or more protocols of network devices. Although network 108 is depicted as a single network, it should be appreciated that according to one or more embodiments, network 108 may comprise a plurality of interconnected networks, such as, for example, the Internet, a service provider's network, a cable television network, corporate networks, and home networks.

In various example embodiments, an account holder may be any individual or entity that desires to conduct a financial transaction using one or more mobile payment accounts held at one or more financial institutions. Also, an account holder may be a computer system associated with or operated by such an individual or entity. As used herein, the term mobile payment account may include any place, location, object, entity, or other mechanism for holding money or performing transactions in any form, including, without limitation, electronic form, via an account holder's mobile device 106. A mobile payment account may be, for example, a credit card account, a prepaid card account, stored value card account, debit card account, check card account, payroll card account, gift card account, prepaid credit card account, charge card account, checking account, rewards account, line of credit account, credit account, mobile device account, or mobile commerce account. The mobile payment account may have an associated network-enabled mobile device, configured to perform financial transactions at a point-of-sale (POS) location—such as, for example, merchant 107—that are charged to the mobile payment account.

As used herein, the term mobile device may be, for example, a handheld PC, a phone, a smartphone, a PDA, a tablet computer, or other device. The mobile device may include Near Field Communication (NFC) capabilities, which may allow for communication with other devices by touching them together or bringing them into close proximity. Example NFC standards include ISO/IEC 18092:2004, which defines communication modes for Near Field Communication Interface and Protocol (NFCIP-1). For example, a mobile device may be configured using the Isis Mobile Wallet™ system, which is incorporated herein by reference. Other example NFC standards include those created by the NFC Forum. Examples of mobile devices also are shown and described in, for example, FIG. 3.

A financial institution 101 may be, for example, a bank, other type of financial institution, including a credit card provider, for example, or any other entity that offers accounts to customers. An mobile payment account may or may not have an associated card, such as, for example, a credit card for a credit account. A mobile payment account may also be a conventional credit or debit card account that enables a mobile device to make payments without having to use the card. Financial institution 101 may have one or more databases comprising information about an account holder's mobile payment account.

As described in reference to FIG. 1, financial institution 101 may provide an account holder with a mobile payment account. The mobile payment account may be associated with the account holder's mobile device 106. The mobile device may be configured to act as a method of payment at a POS location (merchant 107) using, for example, NFC or any other similar mobile payment technology. When account holder uses mobile device 106 at a POS location to perform a financial transaction, the financial transaction may be charged to the mobile payment account. For example, the account holder may use the device 106 in lieu of a credit card to make a purchase merchant 107. The purchase would then be charged to the mobile payment account associated with the account holder device 106. The mobile payment account may be stored in a mobile payment account database at financial institution 101.

Figure 2:
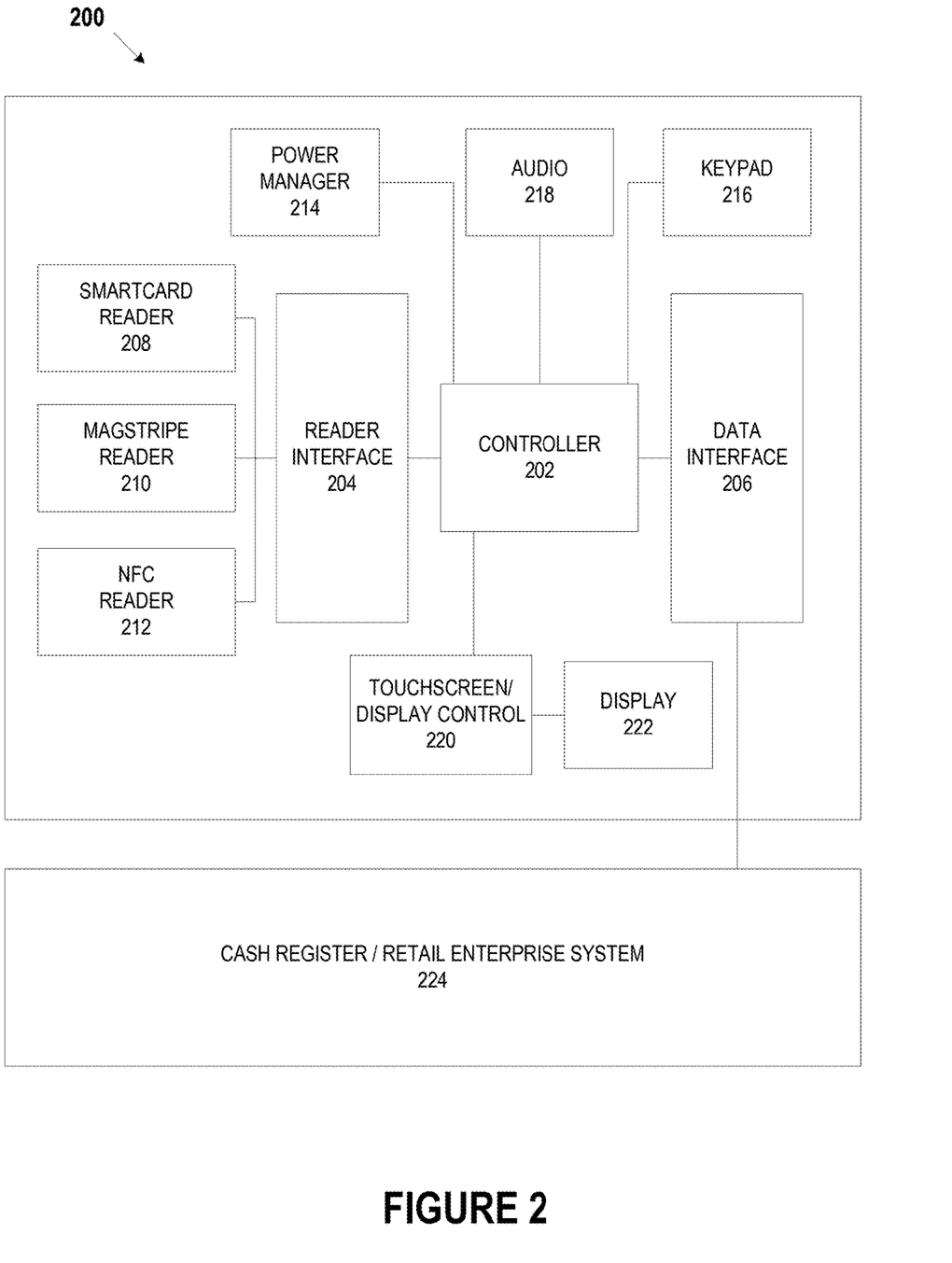
FIG. 2 depicts a schematic diagram of a system for providing a spend feed to an account holder at his or her mobile device according to an example embodiment of the disclosure.

FIG. 2 depicts an example Point of Sale (PoS) device 200. PoS device 200 may provide the interface at what a customer or end user makes a payment to the merchant in exchange for goods or services. In various embodiments, numerous features described with respect to PoS device 200 may be implemented into a spend feed executing on a mobile device (e.g., client device 202).

PoS device 200 may include and/or cooperate with weighing scales, scanners, electronic and manual cash registers, electronic funds transfer at point of sale (EFTPOS) terminals, touch screens and any other wide variety of hardware and software available for use with PoS device 200. PoS device 200 may be a retail point of sale system and may include a cash register and/or cash register-like computer components to enable purchase transactions. PoS device 200 also may be a hospitality point of sale system and include computerized systems incorporating registers, computers and peripheral equipment, usually on a computer network to be used in restaurant, hair salons, hotels or the like. PoS device 200 may be a wireless point of sale device similar to a PoS device described herein or, for example a tablet computer that is configured to operate as a PoS device, including for example, software to cause the tablet computer to execute point of sale functionality and a card reader such as for example the Capital One® SparkPay card reader, the Square® reader, Intuit's® GoPayment reader, or the like. PoS device 200 also may be a cloud-based point of sale system that can be deployed as software as a service, which can be accessed directly from the Internet using, for example, an Internet browser.

Referring to FIG. 2, an example PoS device 200 is shown. PoS device 200 may include a controller 202, a reader interface 204, a data interface 206, a smartcard reader 208, a magnetic stripe reader 210, a near-field communications (NFC) reader 212, a power manager 214, a keypad 216, an audio interface 218, a touchscreen/display controller 220, and a display 222. Also, PoS device 200 may be coupled with, integrated into or otherwise connected with a cash register/retail enterprise system 224.

In various embodiments, Controller 202 may be any controller or processor capable of controlling the operations of PoS device 200. For example, controller 202 may be a Intel® 2nd Generation Core™ i3 or i5 or Pentium™ G850 processor or the like. Controller 202 also may be a controller included in a personal computer, smartphone device, tablet PC or the like.

Reader interface 204 may provide an interface between the various reader devices associated with PoS device 200 and PoS device 200. For example, reader interface 204 may provide an interface between smartcard reader 208, magnetic stripe reader 210, NFC reader 212 and controller 202. In various embodiments, reader interface 204 may be a wired interface such as a USB, RS222 or RS485 interface and the like. Reader interface 204 also may be a wireless interface and implement technologies such as Bluetooth, the 802.11(x) wireless specifications and the like. Reader interface 204 may enable communication of information read by the various reader devices from the various reader devices to PoS device 200 to enable transactions. For example, reader interface 204 may enable communication of a credit or debit card number read by a reader device from that device to PoS device 200. In various embodiments, reader interface 204 may interface between PoS device 200 and other devices that do not necessarily "read" information but instead receive information from other devices.

Data interface 206 may allow PoS device 200 to pass communicate data throughout PoS device and with other devices including, for example, cash register/retail enterprise system 224. Data interface 206 may enable PoS device 200 to integrate with various customer resource management (CRM) and/or enterprise resource management (ERP) systems. Data interface 206 may include hardware, firmware and software that make aspects of data interface 206 a wired interface. Data interface 206 also may include hardware, firmware and software that make aspects of data interface 206 a wireless interface. In various embodiments, data interface 206 also enables communication between PoS device other devices.

Smartcard reader 208 may be any electronic data input device that reads data from a smart card. Smartcard reader 208 may be capable of supplying an integrated circuit on the smart card with electricity and communicating with the smart card via protocols, thereby enabling read and write functions. In various embodiments, smartcard reader 208 may enable reading from contact or contactless smart cards. Smartcard reader 208 also may communicate using standard protocols including ISO/IEC 7816, ISO/IEC 14443 and/or the like or proprietary protocols.

Magnetic stripe reader 210 may be any electronic data input device that reads data from a magnetic stripe on a credit or debit card, for example. In various embodiments, magnetic stripe reader 210 may include a magnetic reading head capable of reading information from a magnetic stripe. Magnetic stripe reader 210 may be capable of reading, for example, cardholder information from tracks 1, 2, and 3 on magnetic cards. In various embodiments, track 1 may be written on a card with code known as DEC SIXBIT plus odd parity and the information on track may be contained in several formats (e.g., ormat A, which may be reserved for proprietary use of the card issuer; format B; format C-M which may be reserved for us by ANSI subcommittee X3B10; and format N-Z, which may be available for use by individual card issuers). In various embodiments, track 2 may be written with a 5-bit scheme (4 data bits plus 1 parity). Track 3 may be unused on the magnetic stripe. In various embodiments, track 3 transmission channels may be used for transmitting dynamic data packet information to further enable enhanced token-based payments. Track 3 transmission channels also may be used to transmit, for example, geolocation data associated with a user, product data relating to the purchase (e.g., product information, stock keeping unit (SKU) level data, and/or any other information that may be used to provide purchase-driven smart statements. PoS device 200 may communicate and or cooperate with the user device to provide the information into track 3 transmission channels. Other methods for providing product level data to a financial institution. For example, a merchant can transmit the product data for each transaction to a financial institution along with information that identifies the transaction.

NFC reader 212 may be any electronic data input device that reads data from a NFC device. In an exemplary embodiment, NFC reader 212 may enable Industry Standard NFC Payment Transmission. For example, the NFC reader 212 may communicate with a NFC enabled device to enable two loop antennas to form an air-core transformer when placed near one another by using magnetic induction. NFC reader 212 may operate at 13.56 MHz or any other acceptable frequency. Also, NFC reader 212 may enable a passive communication mode, where an initiator device provides a carrier field, permitting answers by the target device via modulation of existing fields. Additionally, NFC reader 212 also may enable an active communication mode by allowing alternate field generation by the initiator and target devices.

In various embodiments, NFC reader 212 may deactivate an RF field while awaiting data. NFC reader 212 may receive communications containing Miller-type coding with varying modulations, including 100% modulation. NFC reader 212 also may receive communications containing Manchester coding with varying modulations, including a modulation ratio of approximately 10%, for example. Additionally, NFC reader 212 may be capable of receiving and transmitting data at the same time, as well as checking for potential collisions when the transmitted signal and received signal frequencies differ.

NFC reader 212 may be capable of utilizing standardized transmission protocols, for example but not by way of limitation, ISO/IEC 14443 A/B, ISO/IEC 18092, MiFare, FeliCa, tag/smartcard emulation, and the like. Also, NFC reader 212 may be able to utilize transmission protocols and methods that are developed in the future using other frequencies or modes of transmission. NFC reader 212 also may be backwards-compatible with existing payment techniques, such as, for example RFID. Also, NFC reader 212 may support transmission requirements to meet new and evolving payment standards including internet based transmission triggered by NFC. In various embodiments, NFC reader 212 may utilize MasterCard's® PayPass and/or Visa's® PayWave and/or American Express'® ExpressPay systems to enable transactions.

Although not shown and described, other input devices and/or readers, such as for example, barcode readers and the like are contemplated.

Power manager 214 may be any microcontroller or integrated circuit that governs power functions of PoS device 200. Power manager 214 may include, for example, firmware, software, memory, a CPU, a CPU, input/output functions, timers to measure intervals of time, as well as analog to digital converters to measure the voltages of the main battery or power source of PoS device 200. In various embodiments, Power manager 214 remain active even when PoS device 200 is completely shut down, unused, and/or powered by the backup battery. Power manager 214 may be responsible for coordinating many functions, including, for example, monitoring power connections and battery charges, charging batteries when necessary, controlling power to other integrated circuits within PoS device 200 and/or other peripherals and/or readers, shutting down unnecessary system components when they are left idle, controlling sleep and power functions (on and off), managing the interface for built-in keypad and trackpads, and/or regulating a real-time clock (RTC).

Keypad 216 may any input device that includes a set of buttons arranged, for example, in a block or pad and may bear digits, symbols and/or alphabetical letters. Keypad 216 may be a hardware-based or mechanical-type keypad and/or implemented in software and displayed on, for example, a screen or touch screen to form a keypad. Keypad 216 may receive input from a user that pushed or otherwise activates one or more buttons on keypad 216 to provide input.

Audio interface 218 may be any device capable of providing audio signals from PoS device 200. For example, audio interface may be a speaker or speakers that may produce audio signals. In various embodiments, audio interface 218 may be integrated within PoS device 200. Audio interface 218 also may include components that are external to PoS device 200.

Touchscreen/display control 220 may be any device or controller that controls an electronic visual display. Touchscreen/display control 220 may allow a user to interact with PoS device 200 through simple or multi-touch gestures by touching a screen or display (e.g., display 222). Touchscreen/display control 220 may be configured to control any number of touchscreens, including, for example, resistive touchscreens, surface acoustic wave touchscreens, capacitive touchscreens, surface capacitance touchscreens, projected capacitance touchscreens, mutual capacitance touchscreens, self-capacitance touchscreens, infrared grid touchscreens, infrared acrylic projection touchscreens, optical touchscreens, touchscreens based on dispersive signal technology, acoustic pulse recognition touchscreens, and the like. In various embodiments, touchscreen/display control 220 may receive inputs from the touchscreen and process the received inputs. Touchscreen/display control 220 also may control the display on PoS device 200, thereby providing the graphical user interface on a display to a user of PoS device 200.

Display 222 may be any display suitable for a PoS device. For example, display 222 may be a TFT, LCD, LED or other display. Display 222 also may be a touchscreen display that for example allows a user to interact with PoS device 200 through simple or multi-touch gestures by touching a screen or display (e.g., display 222). Display 222 may include any number of touchscreens, including, for example, resistive touchscreens, surface acoustic wave touchscreens, capacitive touchscreens, surface capacitance touchscreens, projected capacitance touchscreens, mutual capacitance touchscreens, self-capacitance touchscreens, infrared grid touchscreens, infrared acrylic projection touchscreens, optical touchscreens, touchscreens based on dispersive signal technology, acoustic pulse recognition touchscreens, and the like. In various embodiments, 222 may receive inputs from control gestures provided by a user. Display 222 also may display images, thereby providing the graphical user interface to a user of PoS device 200.

Cash register/retail enterprise system 224 may me any device or devices that cooperate with PoS device 200 to process transactions. Cash register/retail enterprise system 224 may be coupled with other components of PoS device 200 via, for example, a data interface (e.g., data interface 206) as illustrated in FIG. 2. Cash register/retail enterprise system 224 also may be integrated into PoS device 200.

In various embodiments, cash register/retail enterprise system 224 may be a cash register. Example cash registers may include, for example, mechanical or electronic devices that calculate and record sales transactions. Cash registers also may include a cash drawer for storing cash and may be capable of printing receipts. Cash registers also may be connected to a network to enable payment transactions. Cash registers may include a numerical pad, QWERTY or custom keyboard, touch screen interface, or a combination of these input methods for a cashier to enter products and fees by hand and access information necessary to complete the sale.

In various embodiments, cash register/retail enterprise system 224 may comprise an retail enterprise system and/or a customer relationship management system. Retail enterprise system 224 may enable retain enterprises to manage operations and performance across a retail operation. Retail enterprise system 224 may be a stand-alone application in, for example, individual stores, or may be interconnected via a network. Retail enterprise system 224 may include various point of sale capabilities, including the ability to, for example, customize and resize transaction screens, work with a "touch screen" graphical user interface, enter line items, automatically look up price (sales, quantity discount, promotional, price levels), automatically compute tax, VAT, look up quantity and item attribute, display item picture, extended description, and sub-descriptions, establish default shipping services, select shipping carrier and calculate shipping charges by weight/value, support multi-tender transactions, including cash, check, credit card, and debit card, accept food stamps, place transactions on hold and recall, perform voids and returns at POS, access online credit card authorizations and capture electronic signatures, integrate debit and credit card processing, ensure optional credit card discounts with address verification, support mix-and-match pricing structure, discount entire sale or selected items at time of sale, add customer account, track customer information, including total sales, number of visits, and last visit date. issue store credit, receive payment(s) for individual invoices, process deposits on orders, search by customer's ship-to address, create and process layaway, back orders, work orders, and sales quotes, credit items sold to selected sales reps, view daily sales graph at the PoS, view and print journals from any register, preview, search, and print journals by register, batch, and/or receipt number, print X, Z, and ZZ reports, print receipts, invoices, and pick tickets with logos/graphics, print kit components on receipt, reprint receipts, enter employee hours with an integrated time clock function, and/or sell when the network/server is down with an offline PoS mode. Retail enterprise system 224 also may include inventory control and tracking capabilities, reporting tools, customer management capabilities, employee management tools, and may integrate with other accounting software.

Referring back to FIG. 1, transaction processor 102 may be configured to receive transaction data via network 108. The transaction data may be associated with a financial transaction performed by the account holder at merchant 107 using account holder device 106. The account holder may perform the transaction using one or more mobile payment accounts associated with device 106. The account holder may purchase one or more goods or services at merchant 107, and the resulting expenses may be charged against the account holder's mobile payment account.

Transaction data may include, for example, the dollar amount of the transaction; the physical address of the merchant 107; the merchant location; product information; any rewards points earned by account holder as a result of the transaction; any logos used by merchant 107; the date and time of the transaction; and any receipts associated with the transaction. The merchant location may be associated with, for example, GPS coordinates. Using account holder device 106 (or another device), account holder may take a picture of a receipt associated with a given transaction and upload it to transaction processor 102. Transaction processor 102 may then store the transaction data in database 104. The transaction data may be associated with the account holder's one or more mobile payment accounts.

Transaction processor 102 may be configured to associate the transaction data with previous transaction data associated with the account holder's mobile payment account. The previous transaction data may be associated with past financial transactions performed by the account holder using account holder device 106, or another device. Previous transaction data may be associated with a previous time period, such as the prior week, month, year, or other time period. The previous transaction data may include information similar to that found in the transaction data.

Spend feed processor 103 may be configured to create a mobile spend feed for the account holder, based at least in part on the transaction data and the previous transaction data stored in database 104 and associated with the account holder's mobile payment account. The information in the mobile spend feed may be represented as a graphical user interface (GUI). The mobile spend feed may display to the account holder a list of transactions that the account holder has performed over a given time period using his mobile payment account. The list of transactions may include, without limitation, mobile payments as well as any other transactions related to the mobile payment account, such as other debit or credit card transactions. The user interface for the mobile spend feed may allow the user to customize the display. Various example embodiments of a mobile spend feed are shown in FIGS. 3-6 and described in greater detail further on in this application.

Spend feed processor 103 may configure the mobile spend feed to highlight one or more transactions based on one or more relevancy criteria. Spend feed processor 103 may determine a transaction is particularly relevant by comparing it to previous transaction data from one or more previous time periods. For example, if the account holder made five purchases at Target in the past year, the spend feed processor 103 may highlight the account holder's most recent purchase at Target in the current version of the spend feed. In another example, the spend feed may highlight a recent purchase based on the location of that purchase if the account holder has made a certain number of purchases at or near that location in the past month, months, year, years, or other relevant time period. In another example, the spend feed may highlight a recent purchase based on the purchase type or category (e.g., food, electronics, clothing, books) if the account holder has made a certain number of purchases in that same category over a prior time period. These are just several non-limiting examples of ways that the spend feed could be configured to highlight certain transaction data and draw the account holder's attention to data points they may be particularly interested in.

Spend feed processor 103 may be configured to provide the mobile spend feed to the account holder's mobile device, as shown in FIGS. 4-7.

Figure 3:
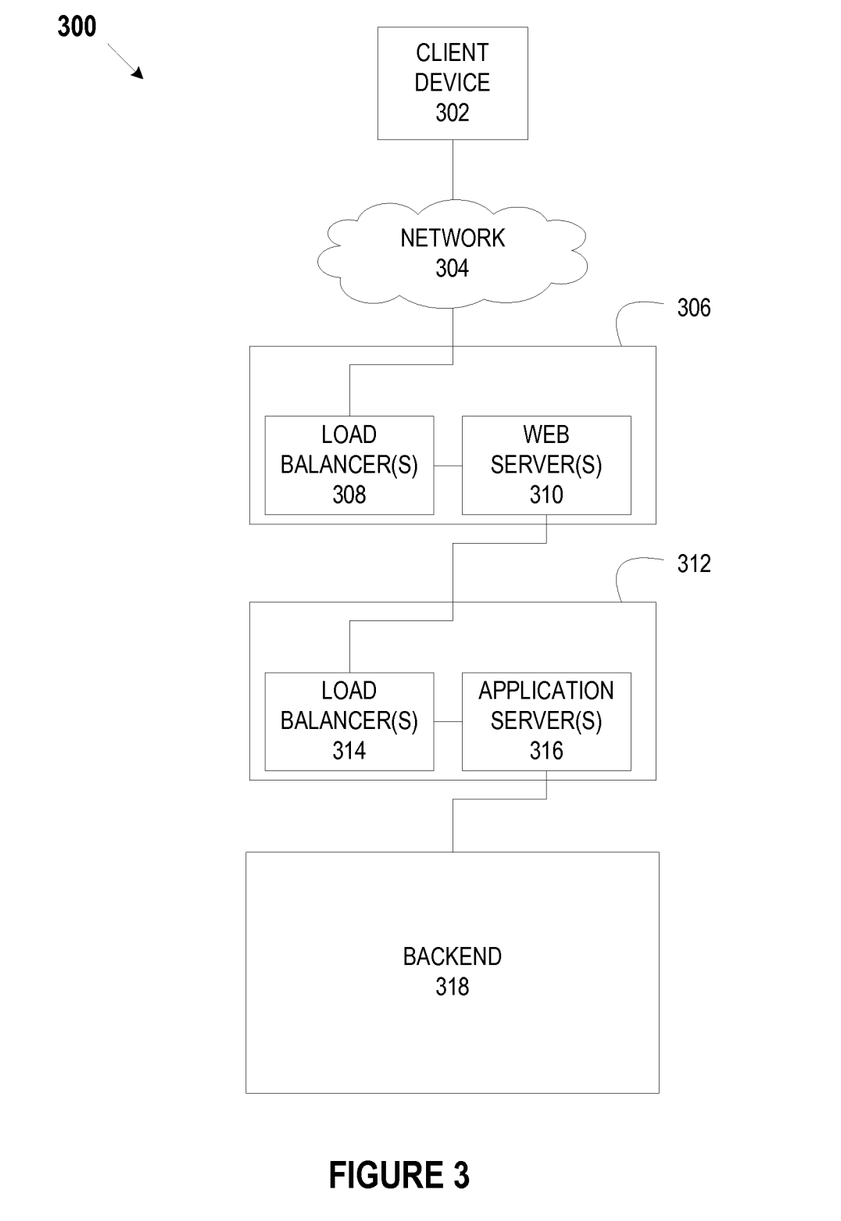
FIG. 3 depicts a schematic diagram of a point of sale system that may be associated with providing a spend feed to an account holder at his or her mobile device according to an example embodiment of the disclosure.

FIG. 3 depicts an example system 300 that may enable a financial institution, for example, to provide network services to its customers. Example system 300 also illustrates examples of merchant systems (e.g., merchant 107). Merchant systems similar to system 300 may enable a financial institution and merchant, for example, to grocery budgeting application to users of client devices (e.g., client device 302). Client device 302 may be similar to the user device used by account holder 106 as described above. Also, network 304 may be similar to network 108 of FIG. 1.

As shown in FIG. 3, system 300 may include a client device 302, a network 304, a front-end controlled domain 306, a back-end controlled domain 312, and a backend 318. Front-end controlled domain 306 may include one or more load balancers 308 and one or more web servers 310. Back-end controlled domain 312 may include one or more load balancers 314 and one or more application servers 316.

Client device 302 may be a network-enabled computer: As referred to herein, a network-enabled computer may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The one or more network-enabled computers of the example system 300 may execute one or more software applications to enable, for example, network communications.

Client device 302 also may be a mobile device: For example, a mobile device may include an iPhone, iPod, iPad from Apple® or any other mobile device running Apple's iOS operating system, any device running Google's Android® operating system, including for example, Google's wearable device, Google Glass, any device running Microsoft's Windows® Mobile operating system, and/or any other smartphone or like wearable mobile device.

Network 304 may be one or more of a wireless network, a wired network, or any combination of a wireless network and a wired network. For example, network 110 may include one or more of a fiber optics network, a passive optical network, a cable network, an Internet network, a satellite network, a wireless LAN, a Global System for Mobile Communication (GSM), a Personal Communication Service (PCS), a Personal Area Networks, (PAN), D-AMPS, Wi-Fi, Fixed Wireless Data, IEEE 802.11b, 802.15.1, 802.11n, and 802.11g or any other wired or wireless network for transmitting and receiving a data signal.

In addition, network 110 may include, without limitation, telephone lines, fiber optics, IEEE Ethernet 902.3, a wide area network (WAN), a local area network (LAN) or a global network such as the Internet. Also, network 110 may support an Internet network, a wireless communication network, a cellular network, or the like, or any combination thereof. Network 110 may further include one network, or any number of example types of networks mentioned above, operating as a stand-alone network or in cooperation with each other. Network 110 may utilize one or more protocols of one or more network elements to which they are communicatively couples. Network 110 may translate to or from other protocols to one or more protocols of network devices. Although network 110 is depicted as a single network, it should be appreciated that according to one or more embodiments, network 110 may comprise a plurality of interconnected networks, such as, for example, the Internet, a service provider's network, a cable television network, corporate networks, and home networks.

Front-end controlled domain 306 may be implemented to provide security for backend 318. Load balancer(s) 308 may distribute workloads across multiple computing resources, such as, for example computers, a computer cluster, network links, central processing units or disk drives. In various embodiments, load balancer(s) 310 may distribute workloads across, for example, web server(S) 316 and/or backend 318 systems. Load balancing aims to optimize resource use, maximize throughput, minimize response time, and avoid overload of any one of the resources. Using multiple components with load balancing instead of a single component may increase reliability through redundancy. Load balancing is usually provided by dedicated software or hardware, such as a multilayer switch or a Domain Name System (DNS) server process.

Load balancer(s) 308 may include software that monitoring the port where external clients, such as, for example, client device 302, connect to access various services of a financial institution, for example. Load balancer(s) 308 may forward requests to one of the application servers 316 and/or backend 318 servers, which may then reply to load balancer 308. This may allow load balancer(s) 308 to reply to client device 302 without client device 302 ever knowing about the internal separation of functions. It also may prevent client devices from contacting backend servers directly, which may have security benefits by hiding the structure of the internal network and preventing attacks on backend 318 or unrelated services running on other ports, for example.

A variety of scheduling algorithms may be used by load balancer(s) 308 to determine which backend server to send a request to. Simple algorithms may include, for example, random choice or round robin. Load balancers 308 also may account for additional factors, such as a server's reported load, recent response times, up/down status (determined by a monitoring poll of some kind), number of active connections, geographic location, capabilities, or how much traffic it has recently been assigned.

Load balancers 308 may be implemented in hardware and/or software. Load balancer(s) 308 may implement numerous features, including, without limitation: asymmetric loading; Priority activation: SSL Offload and Acceleration; Distributed Denial of Service (DDoS) attack protection; HTTP compression; TCP offloading; TCP buffering; direct server return; health checking; HTTP caching; content filtering; HTTP security; priority queuing; rate shaping; content-aware switching; client authentication; programmatic traffic manipulation; firewall; intrusion prevention systems.

Web server(s) 310 may include hardware (e.g., one or more computers) and/or software (e.g., one or more applications) that deliver web content that can be accessed by, for example a client device (e.g., client device 302) through a network (e.g., network 304), such as the Internet. In various examples, web servers, may deliver web pages, relating to, for example, online banking applications and the like, to clients (e.g., client device 302). Web server(s) 310 may use, for example, a hypertext transfer protocol (HTTP or sHTTP) to communicate with client device 302. The web pages delivered to client device may include, for example, HTML documents, which may include images, style sheets and scripts in addition to text content.

A user agent, such as, for example, a web browser, web crawler, or native mobile application, may initiate communication by making a request for a specific resource using HTTP and web server 310 may respond with the content of that resource or an error message if unable to do so. The resource may be, for example a file on stored on backend 318. Web server(s) 310 also may enable or facilitate receiving content from client device 302 so client device 302 may be able to, for example, submit web forms, including uploading of files.

Web server(s) also may support server-side scripting using, for example, Active Server Pages (ASP), PHP, or other scripting languages. Accordingly, the behavior of web server(s) 310 can be scripted in separate files, while the actual server software remains unchanged.

Load balancers 314 may be similar to load balancers 308 as described above.

Application server(s) 316 may include hardware and/or software that is dedicated to the efficient execution of procedures (e.g., programs, routines, scripts) for supporting its applied applications. Application server(s) 316 may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. Also, application server(s) 316 may act as a set of components accessible to, for example, a financial institution or other entity implementing system 300, through an API defined by the platform itself. For Web applications, these components may be performed in, for example, the same running environment as web server(s) 310, and application servers 316 may support the construction of dynamic pages. Application server(s) 316 also may implement services, such as, for example, clustering, fail-over, and load-balancing. In various embodiments, where application server(s) 316 are Java application servers, the web server(s) 316 may behaves like an extended virtual machine for running applications, transparently handling connections to databases associated with backend 318 on one side, and, connections to the Web client (e.g., client device 302) on the other.

Backend 318 may include hardware and/or software that enables the backend services of, for example, a financial institution or other entity that maintains a distributed system similar to system 300. For example, backend 318 may include, a system of record, online banking applications, a rewards platform, a payments platform, a lending platform, including the various services associated with, for example, auto and home lending platforms, a statement processing platform, one or more platforms that provide mobile services, one or more platforms that provide online services, a card provisioning platform, a general ledger system, and the like. Backend 318 may be associated with various databases, including account databases that maintain, for example, customer account information, product databases that maintain information about products and services available to customers, content databases that store content associated with, for example, a financial institution, and the like. Backend 318 also may be associated with one or more servers that enable the various services provided by system 300.

In various examples, backend 318 may include similar components as financial institution 101. In these examples, backend 318 may enable a financial institution, along with the various databases, communication modules and processors associated therewith to provide a spend feed to, for example, users of mobile device 302. Backend 318 also may include various backend components that may be associated with a merchant. For example, backend 318 may include systems similar to the retail enterprise system 224 as shown and described below in FIG. 2.

Figure 4:
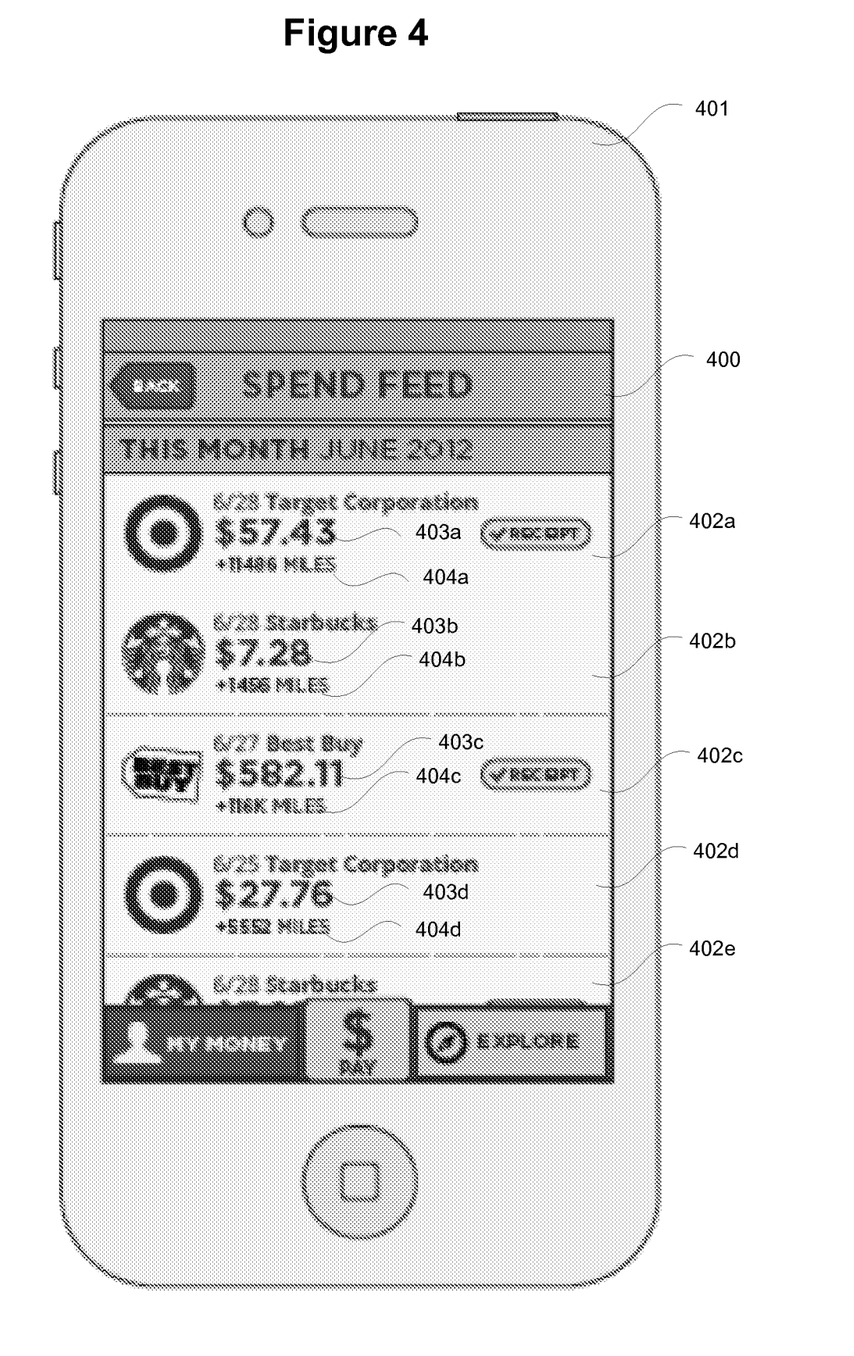
FIG. 4 depicts a screenshot of a spend feed displayed on a mobile device, according to an example embodiment of the disclosure.

FIG. 4 shows a screenshot of a mobile spend feed display, according to an example embodiment of the disclosure. The spend feed may be displayed on the account holder's mobile device. In various embodiments, the spend feed may be configured to be displayed on other devices such as a computer, laptop, tablet, or like device. In FIG. 4, the spend feed displays a list of transactions that the account holder has charged to his mobile payment account and/or related accounts for the month of June. The spend feed may be configured by the account holder to display a list of transactions for other time periods, such as in a given day, week, or year. The spend feed may be configured by the account holder to display transactions organized by merchant, location, rewards points accumulated, price, and other factors. The spend feed processor 103 may configure the spend feed to respond to commands from the account holder, such as commands entered via keypad or a touchscreen on the account holder's mobile device 106.

In the embodiment shown in FIG. 4, the spend feed lists transactions by date, beginning with the most recent. As shown in FIG. 4, the entry for each transaction may include the transaction amount, merchant information, the date, and any rewards that were earned by the account holder based on that transaction. In the embodiment shown in FIG. 5, the mobile payment account has an associated frequent flyer miles rewards plan. The spend feed may display the number of miles earned in a given transaction. The mobile spend feed shown in FIG. 4 may also allow a user to view a receipt associated with the transaction (such as that shown in FIG. 6). Other transaction-related data may also be displayed in the spend feed.

Figure 5:
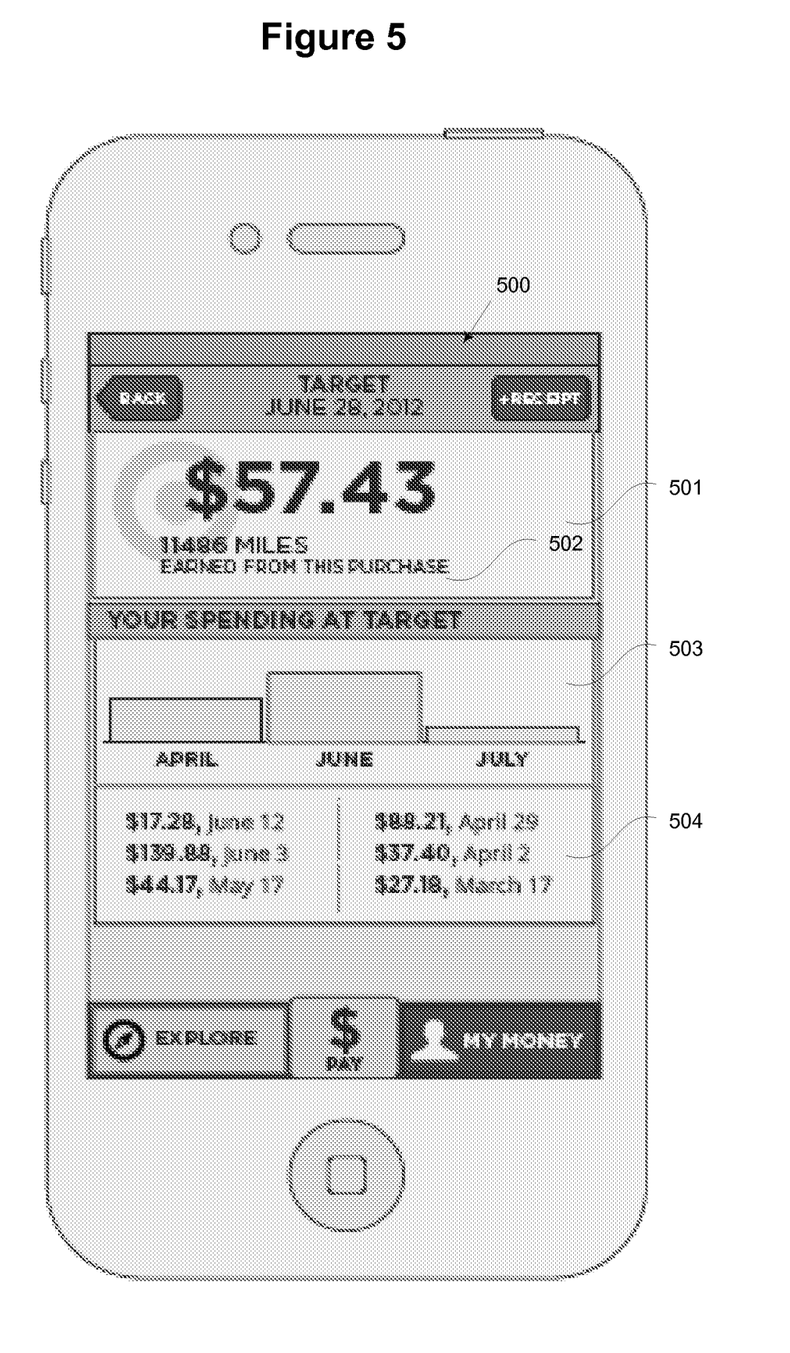
FIG. 5 depicts a screenshot of a spend feed displayed on a mobile device, according to an example embodiment of the disclosure.

FIG. 5 is an example screenshot of a feature of a mobile spend feed display, according to an example embodiment of the disclosure. In FIG. 5, the spend feed displays information associated with a specific purchase at a specific merchant. This may be accessed by an account holder "clicking" on or touching a merchant's logo shown for a given spend entry on the display shown in FIG. 5. The mobile spend feed in FIG. 5 shows that the account holder used his mobile payment account to make a purchase for $57.43 on Jun. 28, 2012 at Target. The mobile spend feed may also show the number of rewards points earned as a result of this purchase. The mobile spend feed may also show a graphical representation of the account holder's total spending at that merchant over a given time period. In the screenshot shown in FIG. 5, the mobile spend feed shows a bar chart of the account holder's monthly spending at Target. The mobile spend feed may also display the most recent purchases at a given merchant and the location of the merchant.

Figure 6:
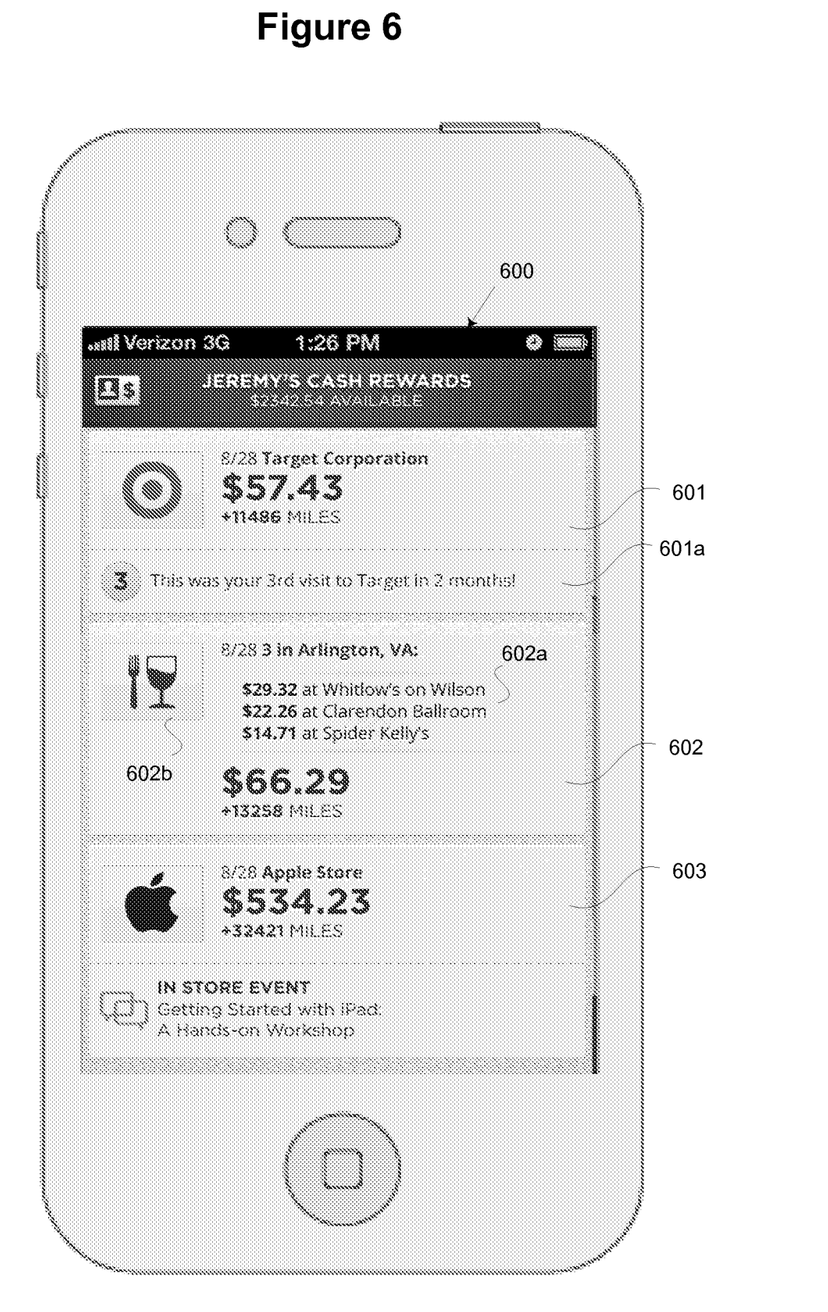
FIG. 6 depicts a screenshot of a spend feed displayed on a mobile device, according to an example embodiment of the disclosure.

FIG. 6 is an example screenshot of a feature of a mobile spend feed display, according to an example embodiment of the disclosure. In FIG. 6, the spend feed displays one or more "spend stories" or "spend events." Spend feed processor 103 may be configured to aggregate and display certain information to the user based on similarities within the transaction data. For example, the spend feed processor may group multiple transactions from the same merchant. The spend feed processor may group multiple transactions over a certain time period. Spend feed processor may group multiple transactions from a similar location and a similar category. In FIG. 6, the spend feed processor has included information noting that the account holder has made 3 visits to Target in the past two months.

Also, as shown in FIG. 6, the spend feed processor may group transactions in a spend event based on a common time and/or date and/or location. For example, the spend feed processor may group a series of transactions from August 28 that were performed in Arlington, Va. The spend feed processor may further determine that the three transactions were from one or more merchants in a similar category. For example, in FIG. 6, the three transactions from August 28 are all eating and drinking establishments. Spend feed processor may present these transactions as a spend event with information that identifies one or more similarities (such as a graphic denoting food, or text stating "a night on the town in Arlington").

FIG. 6 also illustrates how a third party, such as a merchant, may embed content 604 within the spend feed. In the example illustrated in FIG. 6, the spend feed may include information about enrolling in an iPad work shop, embedded within the purchase information about a recent Apple Store purchase. Embedded content also may include, for example, contextual ads, offers and deals, more information about a particular product, a product recommendation, loyalty card and account information, statement information, preferences, photos and videos of an event (e.g., the spend feed could allow a third party such as a social media friend to insert a photo from a restaurant dinner into the spend feed), and/or the like.

Figure 7:
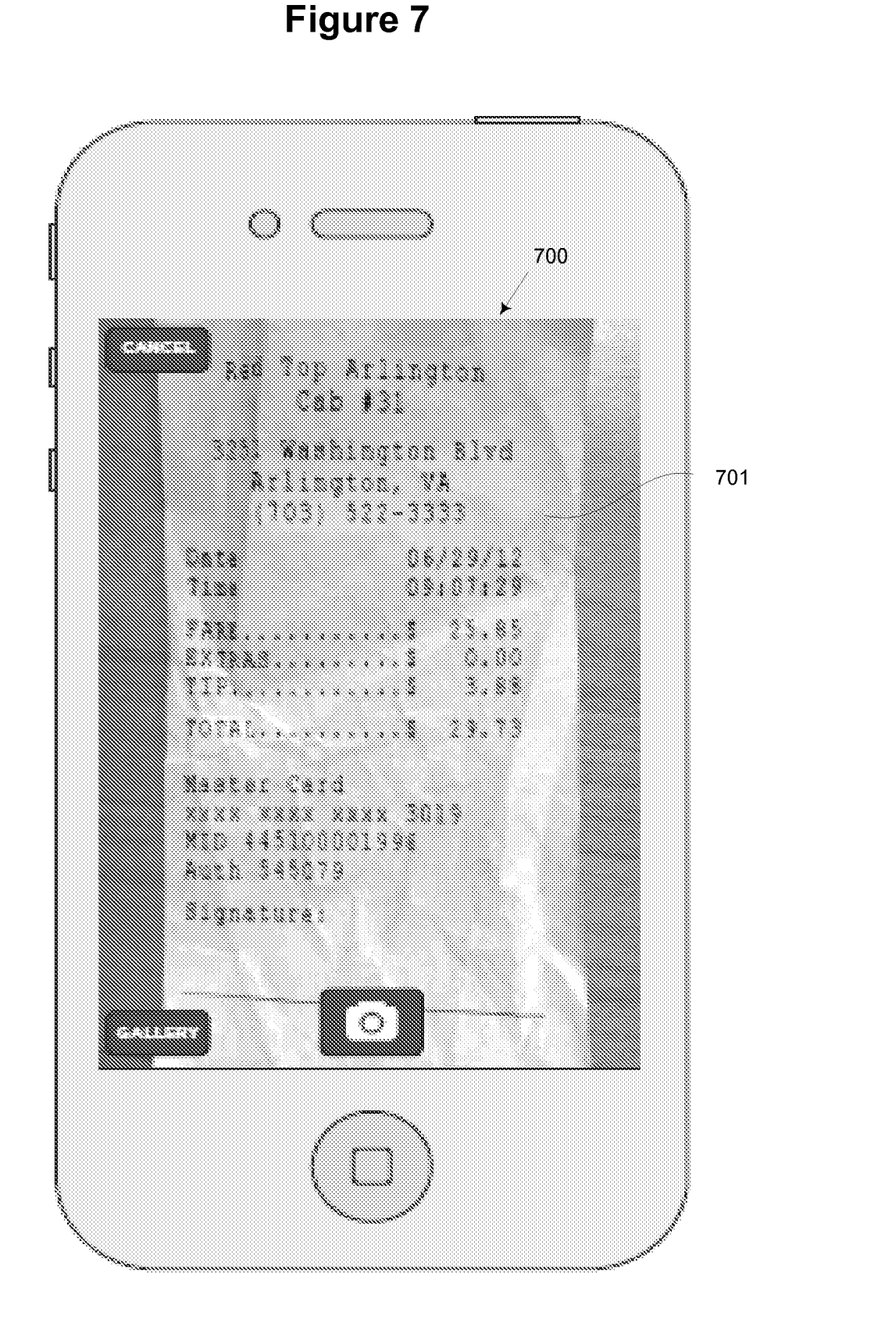
FIG. 7 depicts a screenshot of a receipt capture feature of a spend feed displayed on a mobile device, according to an example embodiment of the disclosure.

FIG. 7 displays another feature of a mobile spend feed, according to an example embodiment of the disclosure. An account holder may take a picture of a receipt, for example, associated with a given transaction. Transaction processor 102 may then retrieve the picture and store it in database 104 along with the other transaction data. The account holder may upload the picture to the transaction processor 102, or spend feed processor 103. The image of the receipt may then be included in the spend feed by spend feed processor 103 and displayed as part of the spend feed. In this way, the spend feed processor may eliminate the need for the account holder to save and keep track of paper receipts. The spend feed processor may also provide a way for the account holder to challenge transactions that are displayed on the spend feed and correct inaccurate information.

Other information that may be displayed on the account holder's mobile spend feed includes, for example, facts about the transaction, and coupons or offers that are associated with a given product or service purchased by the account holder.

Spend feed processor 103 may be configured to provide an account holder's mobile spend feed to social networking site 105, where the spend feed may be associated with one or more social networking accounts held by the account holder. Account holder may share his or her spend feed with one or more other users of the social networking site 105. Account holder may elect to share only portions of his or her spend feed with one or more other users of the social networking site 105.

Spend feed processor 103 may be configured to access one or more social networking accounts held by the account holder at social networking site 105. Spend feed processor 103 may compare transaction data from the account holder's spend feed with social data from the account holders one or more social networking accounts. The social data may include information indicating recent purchases made by one or more of the account holders friends or associates from social networking site 105. Spend feed processor 103 may update the account holder's spend feed to display information highlighting similarities between purchases made by the account holder and similar purchases made by the account holder's friends and associates.

For example, the account holder may have recently purchased basketball shoes at store X. Two of the account holder's Facebook friends may have recently updated their Facebook profile information to reflect the fact that they each purchased basketball shoes from store Y. Account holder may grant spend feed processor 103 access to account holder's Facebook account, and spend feed processor may compare social data from the account holder's friends' profiles with the transaction data in the spend feed. In this example, spend feed processor 103 may update the account holder's spend feed to include an entry highlighting for the account holder that two of his Facebook friends recently bought basketball shoes at store Y. The updated entry in the spend feed may be displayed adjacent to the entry on the spend feed showing the account holder's recent purchase at store X. In this way, the spend feed may inform the account holder of related purchases made by one or more of his social networking friends and associates.

Additionally, spend feed processor may be configured to compare an account holder's transaction data with the transaction data of other account holders who are friends or associates of the account holder on social networking site 105. For example, an account holder may have ten Facebook friends who are also account holders of financial institution 101 and each have their own, individual spend feed. For a given account holder "Joe," spend feed processor 103 may compare Joe's transaction data with the transaction data of his ten Facebook friends. Based on this comparison, spend feed processor 103 may update Joe's spend feed to include one or more entries highlighting recent purchases Joe made that are similar to purchases his friends made. In another example, the spend feed may recommend merchants and/or products frequented by Joe's friends based the transaction data received from Joe's friends. In another example, spend feed processor 103 may compare Joe's current location to the transaction data of Joe's friends to determine if Joe is nearby one or more merchants or stores that are frequented by Joe's friends. If so, spend feed processor 103 may update Joe's spend feed to inform him that "your friends usually shop at store y."

Spend feed processor 103 may be configured to allow the account holder to share the spend feed with one or more other individuals who share access to the mobile payment account. Spend feed processor 103 may be configured to allow the account holder to add "notes" or "comments" to a selected transaction from the spend feed. These notes may then be viewed by others who share access to the mobile payment account when they view the mobile spend feed.

Figure 8:
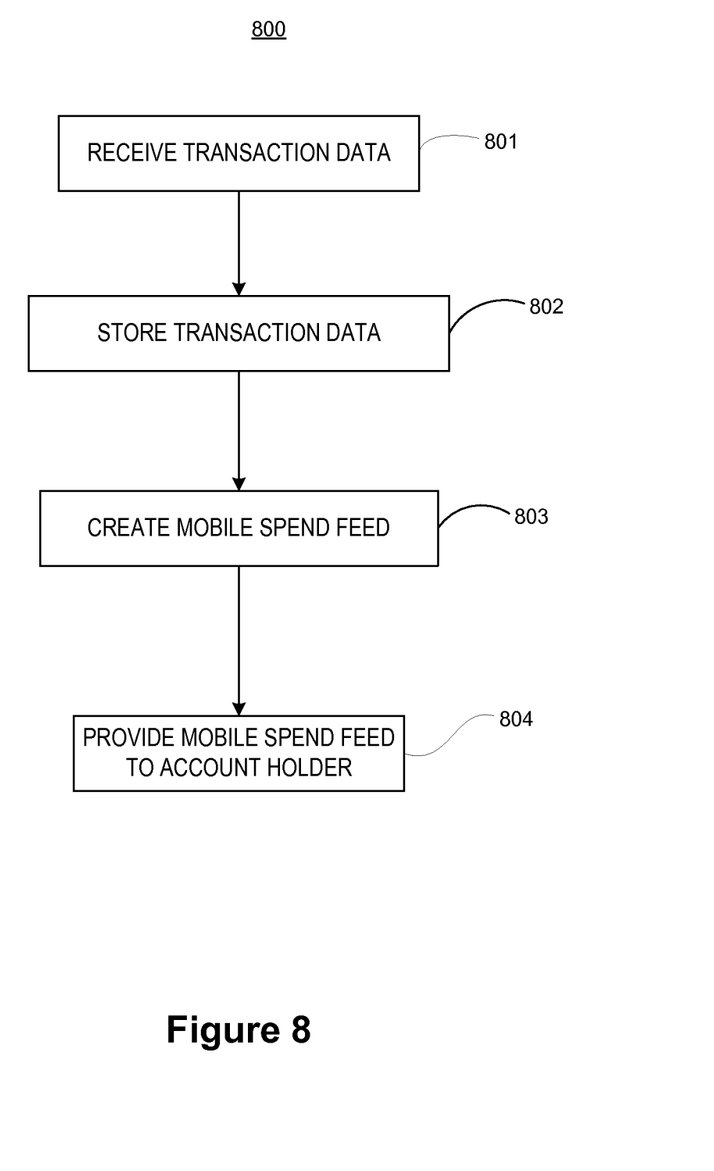
FIG. 8 depicts a schematic diagram of a method for providing a spend feed to an account holder at his or her mobile device according to an example embodiment of the disclosure.

FIG. 8 is a flow chart illustrating a method for providing a spend feed to an account holder at his or her mobile device. This example method is provided by way of example. The method 800 shown in FIG. 8 can be executed or otherwise performed by one or more combinations of various systems. The method 800 as described below may be carried out by the system for providing a spend feed to an account holder at his or her mobile device as shown in FIG. 1, by way of example, and various elements of that system are referenced in explaining the method of FIG. 8. Each block shown in FIG. 8 represents one or more processes, methods, or subroutines in the example method 800. Referring to FIG. 8, the example method 800 may begin at block 801.

In block 801, method 800 may include receiving transaction data from a vendor, the transaction data associated with a financial transaction performed via a financial account held by the account holder. The transaction data may be associated with a financial transaction performed by the account holder at a POS location using account holder's mobile device. The account holder may perform the transaction using one or more mobile payment accounts associated with the mobile device. The account holder may purchase one or more goods or services at the POS location, and the resulting expenses may be charged against the account holder's mobile payment account.

Transaction data may include, for example, the dollar amount of the transaction; the physical address of the merchant; the merchant location; product information; any rewards points earned by account holder as a result of the transaction; any logos used by the merchant; the date and time of the transaction; and any receipts associated with the transaction. The merchant location may be stored as GPS coordinates. Using account holder device (or another device), the account holder may take a picture of a receipt associated with a given transaction and upload it to transaction processor 102. Method 800 may continue at block 802.

In block 802, method 800 may include storing the transaction data in a database, the database containing information associated with at least one previous financial transaction performed via the mobile payment account held by the account holder. One or more processors, such as transaction processor 102 or spend feed processor 103 (shown in FIG. 1), may associate the transaction data with previous financial transaction information associated with the account holder's mobile payment account. The previous transaction data may be associated with past financial transactions performed by the account holder using account holder device 106, or another device. The previous transaction data may include information similar to that found in the transaction data. Method 800 may continue at block 803.

In block 803, method 800 may include creating a mobile spend feed based at least in part on the transaction information and the information from previous transactions. Method 800 may continue at block 804.

In block 804, method 800 may include providing the mobile spend feed to the account holder. The mobile spend feed may be provided to the account holder's one or more mobile devices. The information in the mobile spend feed may be represented as a graphical user interface (GUI). The mobile spend feed may display to the account holder a list of transactions that the account holder has performed over a given time period using his mobile payment account. The user interface for the mobile spend feed may allow the user to customize the display. Various example embodiments of a mobile spend feed are shown in FIGS. 3-5 and have been discussed above.

It is further noted that the software described herein maybe tangibly embodied in one of more physical media, such as, but not limited to, a compact disc (CD), a digital versatile disc (DVD), a floppy disk, a hard drive, read only memory (ROM), random access memory (RAM), as well as other physical media capable of storing software, or combinations thereof. Moreover, the figures illustrate various components (e.g., servers, computers, processors, etc.) separately. The functions described as being performed at various components may be performed at other components, and the various components bay be combined or separated. Other modifications also may be made.

In the preceding specification, various preferred embodiments have been described with references to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded as an illustrative rather than restrictive sense.

The invention claimed is:

1. A system for providing an account holder with a mobile spend feed, comprising:
a database configured to store first previous transaction information for one or more first previous financial transactions performed using a mobile device associated with a first account holder of a first financial account;
one or more processors;
a memory in communication with the one or more processors and storing instructions that, when executed by the one or more processors, are configured to cause the one or more processors to:
receive transaction data associated with a financial transaction performed by the first account holder using the first financial account;
receive an image of a receipt;
associate the image of the receipt with the transaction data associated with the financial transaction;
store the transaction data and the image of the receipt in the database;
categorize the financial transaction into a first category;
determine a count of first previous financial transactions in the first category within a predetermined time period;
determine whether the count exceeds a threshold count;
responsive to determining that the count exceeds the threshold count, generate highlighting information for the financial transaction;
embed an interactive receipt button with the transaction data that is to be displayed by a graphical user interface (GUI), and when pressed, displays the image of the receipt;
create an interactive mobile spend feed based at least in part on the transaction data, the first previous transaction information, the image of the receipt, the interactive receipt button, and highlighting information, wherein the interactive mobile spend feed comprises one or more spend feed events, wherein creating each spend feed event comprises automatically selecting data associated with one or more other financial transactions from different merchants and automatically grouping the transaction data with the automatically selected data; and
transmit the interactive mobile spend feed to the mobile device associated with the first account holder for display in the GUI.

2. The system of claim 1, wherein the interactive mobile spend feed is provided to a social media account of the first account holder.

3. The system of claim 1, wherein the interactive mobile spend feed includes rewards information associated with the financial transaction.

4. The system of claim 1, wherein the interactive mobile spend feed is provided within a native application executing on the mobile device.

5. The system of claim 1, wherein the interactive mobile spend feed is provided within a mobile optimized web application executing on the mobile device.

6. The system of claim 1, wherein the interactive mobile spend feed combines the transaction data with data associated with a previous transaction to create a graphical representation of the transaction data and the data associated with the first previous transaction information.

7. The system of claim 1, wherein the database is further configured to store second previous transaction information for one or more second previous financial transactions performed via a second financial account held by a second account holder; and
wherein the interactive mobile spend feed is based at least in part on the transaction data, second previous transaction information, first previous transaction information, the image of the receipt, and the interactive receipt button.

8. The system of claim 1, wherein the image of the receipt is captured and received from the mobile device.

9. The system of claim 1, wherein the spend feed event is automatically named using the transaction data and the first previous transaction information.

10. The system of claim 9, wherein the spend feed displays a graphic to indicate a spend feed event, and the graphic is related to the name of the spend feed event.

11. The system of claim 1, wherein the spend feed event is automatically named based on the time period and a location of the financial transaction and the one or more other financial transactions.

12. The system of claim 1, wherein creating the spend feed event further comprises automatically grouping the transaction data with the automatically selected data based on the time period and a location of the financial transaction and the one or more other financial transactions.

13. A method for providing a first account holder with a mobile spend feed, comprising:
storing first previous transaction information associated with one or more first previous financial transactions performed via a first financial account held by the first account holder in a spend feed database;
receiving, via a network, transaction data associated with a financial transaction performed by the first account holder using the first financial account;

receiving an image of a receipt;
associating the image of the receipt with the transaction data associated with the financial transaction;
storing the transaction data and the image of the receipt in the spend feed database;
categorizing the financial transaction into a first category;
determining a count of first previous financial transactions in the first category within a predetermined time period;
determining that the count exceeds a threshold count;
responsive to determining that the count exceeds the threshold count, generating highlighting information for the financial transaction;
embedding an interactive receipt button with the transaction data that is to be displayed by a graphical user interface (GUI), and when pressed displays the image of the receipt;
creating an interactive mobile spend feed based at least in part on the transaction data, the first previous transaction information, the image of the receipt, the interactive receipt button, and highlighting information;
automatically selecting at least a portion of the first previous transaction information from different merchants to group with the transaction data;
automatically grouping the transaction data with the first previous transaction information;
automatically creating a spend feed event based on the grouped transaction data and first previous transaction information; and
transmitting the interactive mobile spend feed to a mobile device associated with the first account holder for display in the GUI.

14. The method of claim 13, further comprising providing the interactive mobile spend feed to a social media account of the first account holder.

15. The method of claim 13, wherein the interactive mobile spend feed includes rewards information associated with the financial transaction.

16. The method of claim 13, further comprising providing the interactive mobile spend feed within a native application executing on the mobile device.

17. The method of claim 13, further comprising providing the interactive mobile spend feed within a mobile optimized web application executing on the mobile device.

18. The method of claim 13, further comprising combining the transaction data with data associated with the one or more first previous financial transactions to create a graphical representation of the transaction data and the data associated with the one or more first previous financial transactions.

19. The method of claim 13, further comprising:
storing second previous transaction information associated with one or more second previous financial transactions performed via a second financial account held by a second account holder; and
creating the interactive mobile spend feed based at least in part on the transaction data, the first previous transaction information, the image of the receipt, and the second previous transaction information.

20. A system for providing an account holder with a mobile spend feed, comprising:
one or more processors;
a memory in communication with the one or more processors and storing instructions that, when executed by the one or more processors, are configured to cause the one or more processors to:
receive transaction data associated with a financial transaction performed by the account holder using a financial account;
receive an image of a receipt associated with the financial transaction;
associate the image of the receipt with the transaction data;
categorize the financial transaction into a first category;
determine a count of first previous financial transactions in the first category within a predetermined time period;
determine whether the count exceeds a threshold count;
responsive to determining that the count exceeds the threshold count, generate highlighting information for the financial transaction;
embed an interactive receipt button with the transaction data so that the interactive receipt button can be displayed by a graphical user interface (GUI) that, when pressed, displays the image of the receipt;
create an interactive mobile spend feed based at least in part on the transaction data, the image of the receipt, the interactive receipt button, and the highlighting information, wherein the interactive mobile spend feed comprises one or more spend feed events, wherein creating each spend feed event comprises automatically selecting data associated with one or more other financial transactions from different merchants and automatically grouping the transaction data with the automatically selected data; and
transmit the interactive mobile spend feed to a mobile device associated with the account holder for display in the GUI.

* * * * *